(12) United States Patent
Kendall et al.

(10) Patent No.: US 11,391,153 B2
(45) Date of Patent: Jul. 19, 2022

(54) AUTONOMOUS ROOF BOLTER AND RELATED METHODS

(71) Applicant: J.H. FLETCHER & CO., Huntington, WV (US)

(72) Inventors: William Garnet Kendall, Chesapeake, OH (US); Timothy D. Burgess, South Point, OH (US); Robert D. Burgess, Huntington, WV (US); William A. Burgess, Huntington, WV (US)

(73) Assignee: J.H. Fletcher & Co., Huntington, WV (US)

( * ) Notice: Subject to any disclaimer, the term of this patent is extended or adjusted under 35 U.S.C. 154(b) by 0 days.

(21) Appl. No.: 16/639,437

(22) PCT Filed: Aug. 28, 2018

(86) PCT No.: PCT/US2018/048273
§ 371 (c)(1),
(2) Date: Feb. 14, 2020

(87) PCT Pub. No.: WO2019/046253
PCT Pub. Date: Mar. 7, 2019

(65) Prior Publication Data
US 2021/0040848 A1      Feb. 11, 2021

Related U.S. Application Data

(60) Provisional application No. 62/550,900, filed on Aug. 28, 2017.

(51) Int. Cl.
*E21D 20/00* (2006.01)
*G05D 1/02* (2020.01)

(52) U.S. Cl.
CPC ......... *E21D 20/006* (2013.01); *E21D 20/003* (2013.01); *G05D 1/0248* (2013.01)

(58) Field of Classification Search
CPC ....... E21B 19/14; E21B 19/15; E21D 20/006; E21D 21/0093; E21D 20/023;
(Continued)

(56) References Cited

U.S. PATENT DOCUMENTS 4,202,653 A * 5/1980 Moller ................. B65G 1/0442
                                                         414/22.57
4,398,850 A * 8/1983 Talvensaari ........... E21D 20/006
                                                         173/193
(Continued)

FOREIGN PATENT DOCUMENTS

CN          203783615 U    8/2014
WO          2016001315 A1   1/2016

*Primary Examiner* — Benjamin F Fiorello
(74) *Attorney, Agent, or Firm* — Dickinson Wright PLLC; Andrew D. Dorisio (57) ABSTRACT

An autonomous roof bolter includes a material handling system having a storage pod with a plurality of spaced, fixed holders, each receiving at least one of a plurality of roof bolts. A guidance system may automatically guide the roof bolter to a location for installing a roof bolt, such as by using a manipulator for retrieving the roof bolt from the storage pod and delivering it to a drill mast. The guidance provided by the guidance system may be distance or direction. Related methods are disclosed.

20 Claims, 9 Drawing Sheets

(58) Field of Classification Search
CPC ... E21D 20/026; E21D 20/003; B65G 1/0442; B65G 1/0478
See application file for complete search history.

(56) References Cited

U.S. PATENT DOCUMENTS

| | | | | |
|---|---|---|---|---|
| 5,114,279 | A * | 5/1992 | Bjerngren | E21D 20/006 405/303 |
| 5,720,582 | A * | 2/1998 | Morrison | E21D 20/006 29/809 |
| 6,447,210 | B1 * | 9/2002 | Coombs | E21D 20/025 405/259.5 |
| 6,497,536 | B1 | 12/2002 | Neilson et al. | |
| 6,976,540 | B2 * | 12/2005 | Berry | E21B 19/00 166/380 |
| 9,562,407 | B2 * | 2/2017 | Magnuson | E21B 19/20 |
| 9,828,855 | B2 * | 11/2017 | Nelson | E21D 20/006 |
| 9,932,783 | B2 * | 4/2018 | Magnuson | E21B 19/14 |
| 2004/0177979 | A1 * | 9/2004 | Rubie | E21D 11/40 173/28 |
| 2007/0286707 | A1 * | 12/2007 | Eddowes | E21B 19/20 414/22.51 |
| 2008/0164064 | A1 * | 7/2008 | Belik | E21B 19/155 175/52 |
| 2008/0240866 | A1 | 10/2008 | Hinshaw et al. | |
| 2015/0016925 | A1 * | 1/2015 | Larkin | B66C 1/00 414/22.63 |
| 2016/0115789 | A1 * | 4/2016 | Nystrom | E21D 20/028 221/1 |
| 2017/0159434 | A1 * | 6/2017 | Pettersson | E21D 20/003 |

* cited by examiner

AUTONOMOUS ROOF BOLTER AND RELATED METHODS

This application claims the benefit of U.S. Provisional Patent Application Ser. No. 62/550,900, filed Aug. 28, 2017, the disclosure of which is incorporated herein by reference.

TECHNICAL FIELD

This application relates to the underground mining arts and, in particular, to a roof bolter that may operate at least partly, and potentially fully, in an autonomous manner.

BACKGROUND

In underground mining, roof bolters are commonly used to drill holes into the roof and install roof bolts to support the roof. The majority of roof bolters in underground mines are manually operated. Specifically, an operator manually places a drill steel into a dedicated drill head, drills the hole by operating manual controls, and then removes the drill steel. Next, a bolt inserter (wrench) is typically placed in the drill head, and a roof bolt is placed in the bolt inserter. The operator then installs the bolt by operating manual controls. This process is very labor intensive and relies heavily on the operator's judgment as to where to install roof bolts.

Where space and other parameters allow, remotely controlled roof bolters are used. These machines typically have a dedicated drill module with dedicated drill steel, a dedicated bolt module with a dedicated bolt wrench, and a bolt storage carousel. Typically, bolt carousels are limited to storing a maximum of approximately 16 bolts simply due to the size of the carousel.

To operate the machine, the operator first manually places bolts into the bolt carousel. The bolts are held in place with some type of retaining mechanism, which can require a significant amount of force for the operator to overcome. Wear and tear of the retainers can result in bolts falling out of the carousel during machine operation. The operator then enters a remote operating area on the machine, frequently a fully enclosed cab. The operator can now safely tram the machine, position the drill and bolt modules, drill holes and insert bolts. After the bolts in the carousel are used, the machine must be moved back to a safe area and additional bolts placed in the carousels.

Mine engineers design a specific roof control plan which determines the type, size, length, and location of each roof bolt. It is critical that the holes be drilled in the locations specified by the engineer. In addition, roof bolts are used to suspend items such as belt conveyor structure from the roof. Proper operation of the belt conveyor is dependent upon the bolts being installed in precise locations to help ensure proper alignment.

Typically, the location of where to drill holes and install bolts is estimated visually by the operator. This results in significant variance in bolt placement. Even if a tape measure or similar device is used there will be relatively large tolerances on each specific bolt installed. These tolerances will be compounded as more and more rows of bolts are installed.

A fully autonomous machine, with proper guidance and positioning systems, along with the ability to store and manipulate a large number of roof bolts, would significantly improve safety, efficiency, and accuracy of the bolt installation process. Furthermore, a system which would reduce operator effort to place the bolts in the storage device, which would hold a larger number of bolts, reduce the possibility of bolts falling out of the storage device, and allow for automation of bolt movement from the storage device to the bolt module, would be a significant improvement in safety and efficiency. A more accurate and simple method of accurately positioning the roof bolting machine would allow for more accurate bolt installation and also allow for automation of the machine positioning.

SUMMARY

According to one aspect of the disclosure, a material handling system for a roof bolter comprises a plurality of roof bolts. A storage pod includes a plurality of spaced, fixed holders, each spaced, fixed holder receiving at least one of the plurality of roof bolts.

In one embodiment, the system further includes a manipulator for retrieving individual roof bolts from the storage pod for installation. The storage pod may comprise a box for at least partially receiving a portion of each of the plurality of roof bolts. The box may be adapted to be lifted by a lifter.

The plurality of fixed holders may be arranged in a grid. The grid may comprise first and second rows of fixed holders. The first and second rows may be generally parallel, or generally perpendicular. Each of the plurality of fixed holders comprises aligned openings formed in spaced plates, and may hold between 16-300 roof bolts.

According to a further aspect of the disclosure, a machine for traversing a mine passage and installing at least one roof bolt therein is provided. The machine comprises a bolt holder for holding the at least one roof bolt, and a drill mast for installing the at least one roof bolt in the mine passage. A guidance system is provided for automatically guiding the machine to a location for installing the at least one roof bolt.

In one embodiment, the guidance system comprises a laser mounted at a fixed location in the mine passage and a reflective target mounted on the machine in a path of the laser, whereby a position of the laser on the target may be used to control alignment of the machine within the mine passage. A camera may be provided for capturing the position of the laser on the target, which position may be used for guiding movement of the roof bolter. The reflective target may be mounted on a gimbal to ensure verticality, and a transparent or translucent target may be placed in series with the reflective target.

In this or another embodiment, the guidance system may comprise a distance sensor including a laser, a sensor, and a reflective target in a path of the laser. The arrangement is such that a time of flight may be determined in order to guide movement of the roof bolter in a forward direction. The distance sensor may be mounted on a gimbal.

The bolt holder may comprise a storage pod for holding a plurality of roof bolts, and a manipulator for individually feeding the roof bolts from the storage pod for installation. Alternatively, the bolt holder may comprise a carousel for holding a plurality of roof bolts.

According to a further aspect of the disclosure, a method for installing a roof bolt in a mine passage using a roof bolter is provided. The method comprises withdrawing the roof bolt axially from a holder associated with a bolter, the holder preventing side-to-side movement of the roof bolt. The method further comprises installing the roof bolt in a borehole formed in the mine passage.

Yet a further aspect of the disclosure pertains to a method for installing roof bolts in a mine passage using a roof bolter. The method comprises (a) using a laser-based system, determining a heading or a travel distance of the roof bolter to reach a first position within the mine passage; and (b)

installing a roof bolt at the first position. The method may further comprise repeating steps (a) and (b) for a second position.

In one embodiment, the installing step comprises retrieving the roof bolt from a fixed holder and then using a drill mast to install the roof bolt in a borehole in the mine passage at the first position. The installing step may comprise retrieving the roof bolt from a carousel and then using a drill mast to install the roof bolt in a borehole in the mine passage at the first position.

Still another aspect of the disclosure pertains to a method for installing roof bolts in a mine passage using a roof bolter. The method comprises guiding the roof bolter for movement within the mine passage via a laser-based guidance system for installing a plurality of roof bolts in an aligned row along the passage. The guiding step may comprise mounting a laser at a fixed location in the mine passage, mounting a reflective target mounted on the roof bolter in a path of the laser, and using a position of the laser on the target to control the alignment of the roof bolter within the mine passage. The method may further include the step of placing a transparent or translucent target placed in series with the reflective target. The guiding step may comprise projecting a laser onto a reflective target and using a sensor to determine the time of flight in order to guide the advance of the roof bolter within the mine passage.

BRIEF DESCRIPTION OF THE DRAWING FIGURES

The accompanying drawing figures incorporated herein and forming a part of the specification, illustrate several aspects of the disclosed inventions and, together with the description, serve to explain certain principles thereof. In the drawing figures.

Reference will now be made in detail to the present preferred embodiments of the disclosed inventions, examples of which are illustrated in the accompanying drawing figures.

DETAILED DESCRIPTION

With reference to FIGS. 1-11, an at least partially autonomous roof bolter 10 is disclosed that may resolve some or all of the foregoing concerns, and possibly others that have yet to be realized. As can be understood from FIGS. 1-3, the bolter 10 may comprise a mobile vehicle V including ground-engaging structures, such as wheels W, for traversing about a mine passage P and installing roof bolts T into corresponding surfaces thereof, such as the roof R, as is outlined further in the following description. Despite the use of the term "roof" bolts, it will be understood by skilled artisans that this is meant to include and cover the installation of anchors in any surface of the mine passage, including the ribs I.

According to one aspect of the improved bolter 10, a pod 12 for handling and temporarily storing bolts T is provided. As perhaps best understood from FIGS. 5, 6, and 7, the storage pod 12 comprises a box 12a with fixed, spaced apart holders 14, each for at least partially receiving the specific roof bolt T (which may of course vary in size, shape, or functionality depending on the particular application). The holders 14 may be formed by upper and lower retainers, such as plates 14a, 14b having aligned openings. The aligned openings thus form receivers for receiving and holding the bolts T in a vertical orientation in the illustrated embodiment. The holders 14 may be designed such that the roof bolt T can simply be dropped into place (such as from above), and the corresponding holder automatically orients the bolt and holds it in an accurate location for retrieval (e.g., with an upper, grippable portion of the bolt T extending above the upper periphery of the box 12a).

The pod 12 may be pre-loaded on the surface of the mine or at a remote bolt storage location. As perhaps best understood from reviewing FIGS. 4-8, the box 12a may be designed such that it can be handled with a lifter, such as a forklift, and placed onto the vehicle V of bolter 10. The box 12a may be fabricated of metal, and may be generally rectangular in cross-sectional shape or plan view, but other shapes could be used as well. In a typical application, the pod 12 can be designed to hold from about 16 to about 300 bolts (with a preference for one bolt T in each holder 14).

Figure 1:
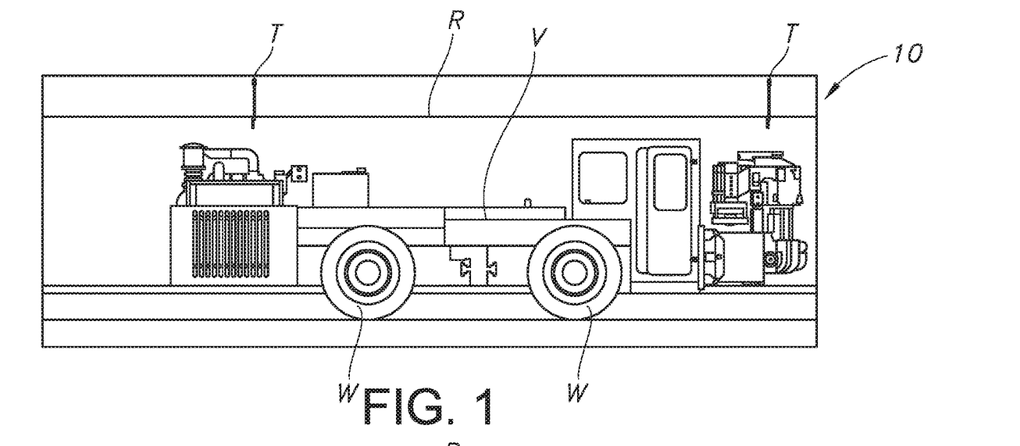
FIG. 1 is a side view of a mine machine, such as a roof bolter.
Figure 2:
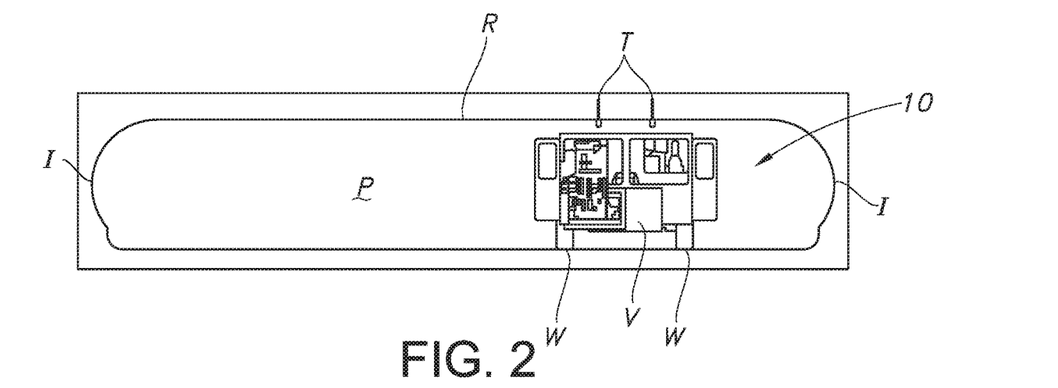
FIG. 2 is an end view of the mine machine.
Figure 3:
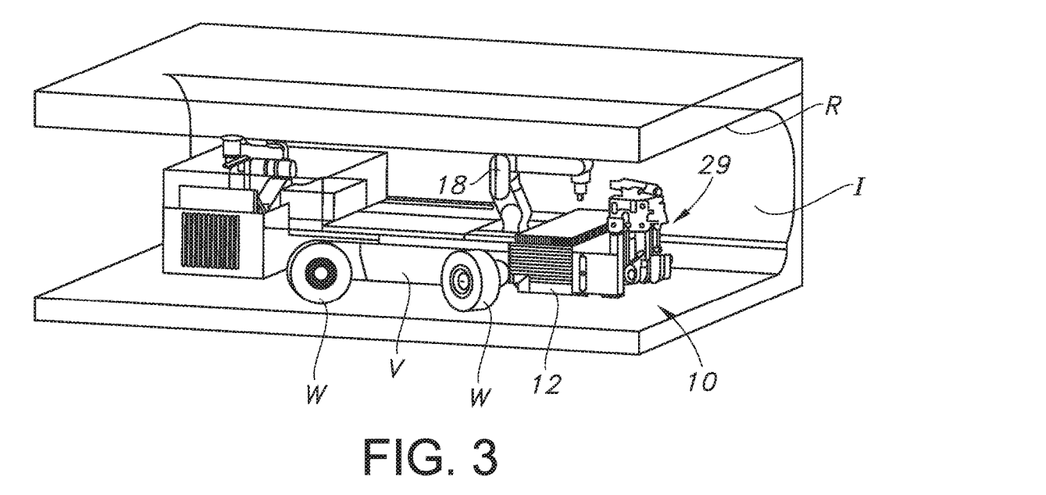
FIG. 3 is a perspective view of the mine machine.
Figure 4:
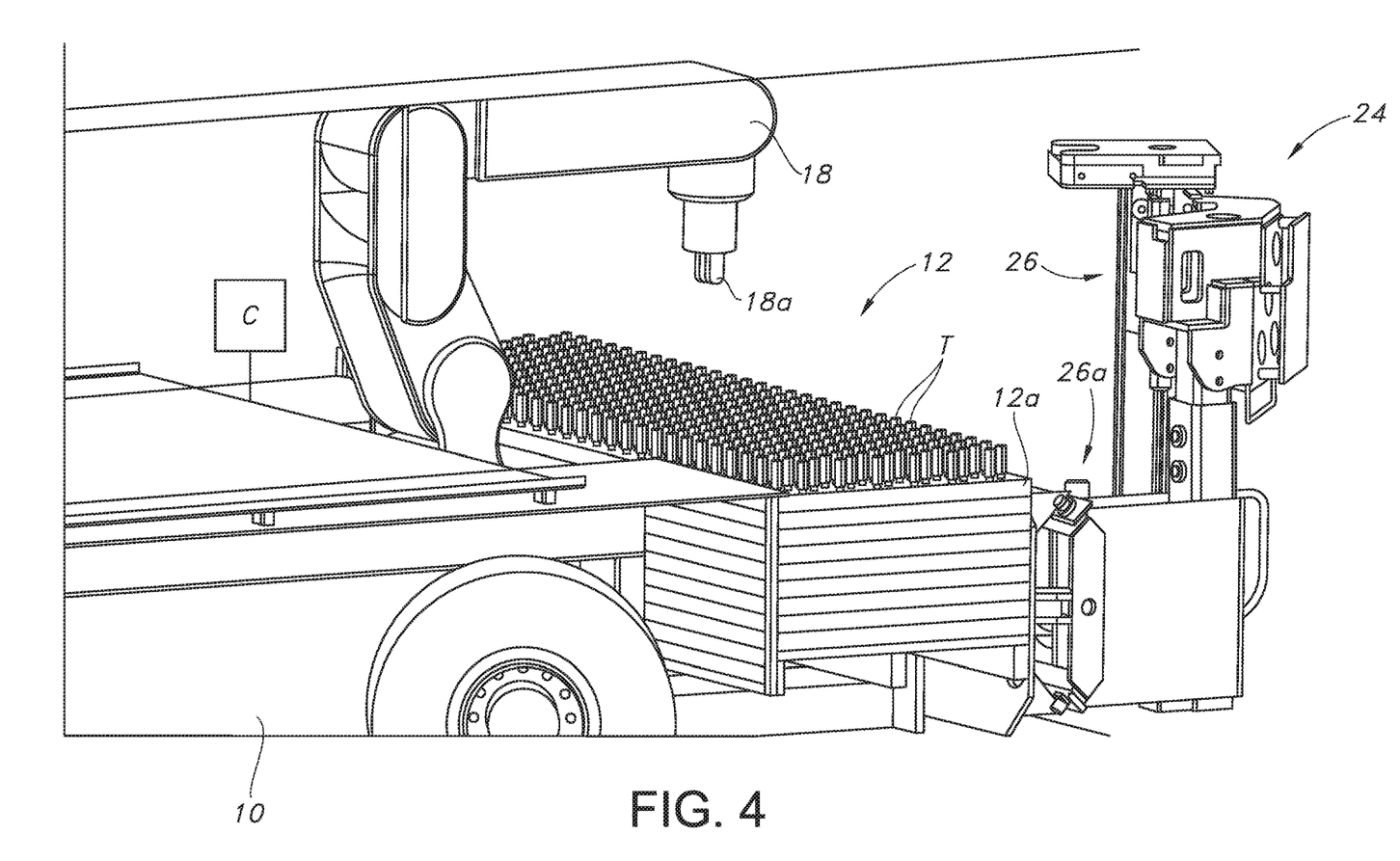
FIG. 4 is an enlarged perspective view of a portion of the mining machine including a storage pod for receiving roof bolts and a manipulator for delivering the bolts to a drill mast for installation.

As indicated in FIG. 4, a bolt manipulator, such as a multi-axis robotic arm 18 with a gripper 18a, may be mounted to the vehicle V in proximity to the bolt storage pod 12. An onboard controller or computer C may be provided to direct the robotic arm 18 to retrieve a specific bolt T from a corresponding holder 14 (which bolt may be unrestrained for movement in an axial direction (e.g., vertically in the illustrated embodiment), but held against side-to-side movement laterally) and deliver it to the bolting module 24. This module 24 may comprise an extendable mast 26 including a drill 26a for drilling a borehole in a surface of the mine passage P, and also for guiding the bolt T into the borehole once formed (but separate masts and drills could be used for these purposes). This sequence could be triggered by a human, or the bolter 10 may automatically trigger the process using sensors.

Figure 5:
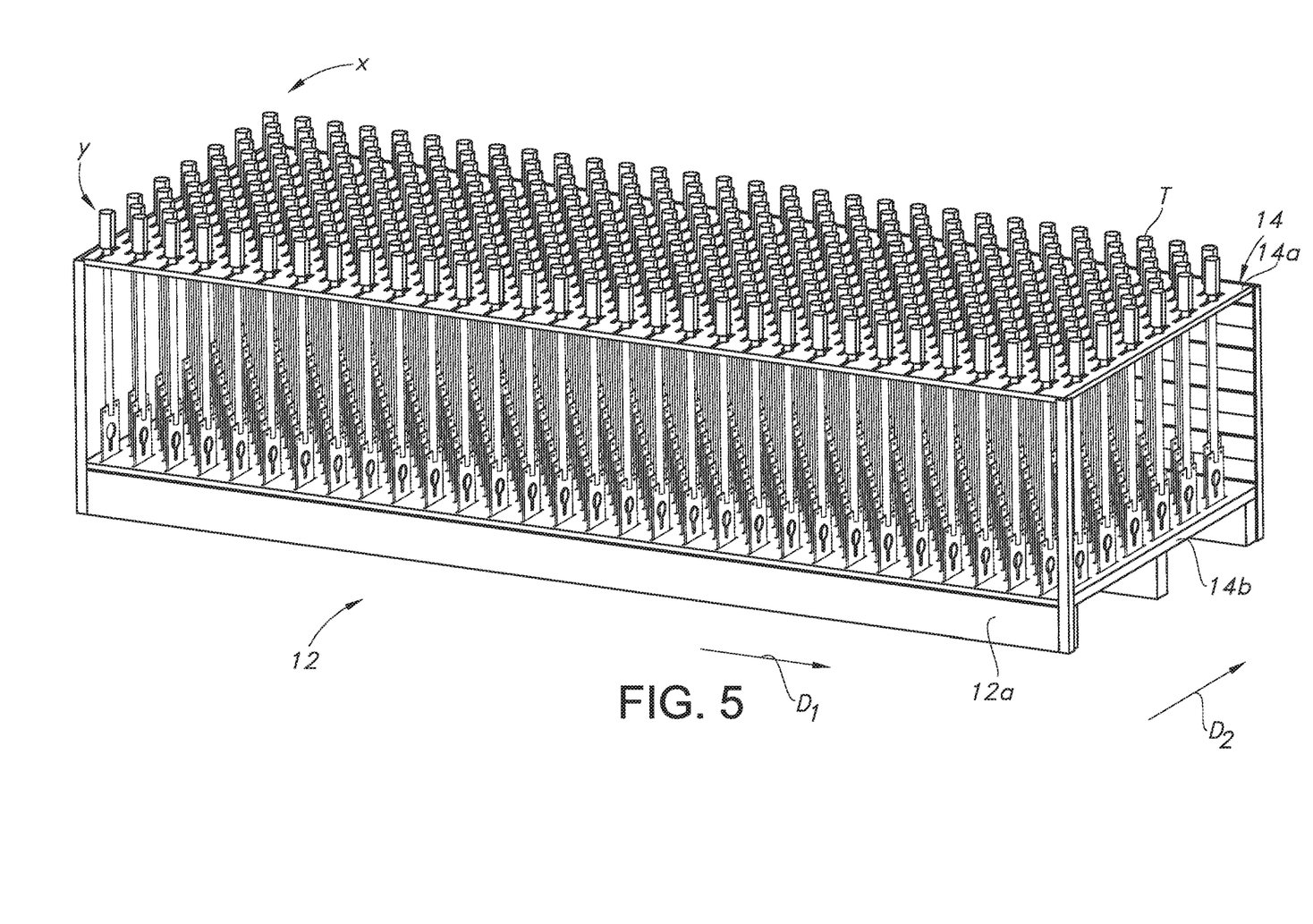
FIGS. 5, 6, 7 are various views of one embodiment of the storage pod.
Figure 6:
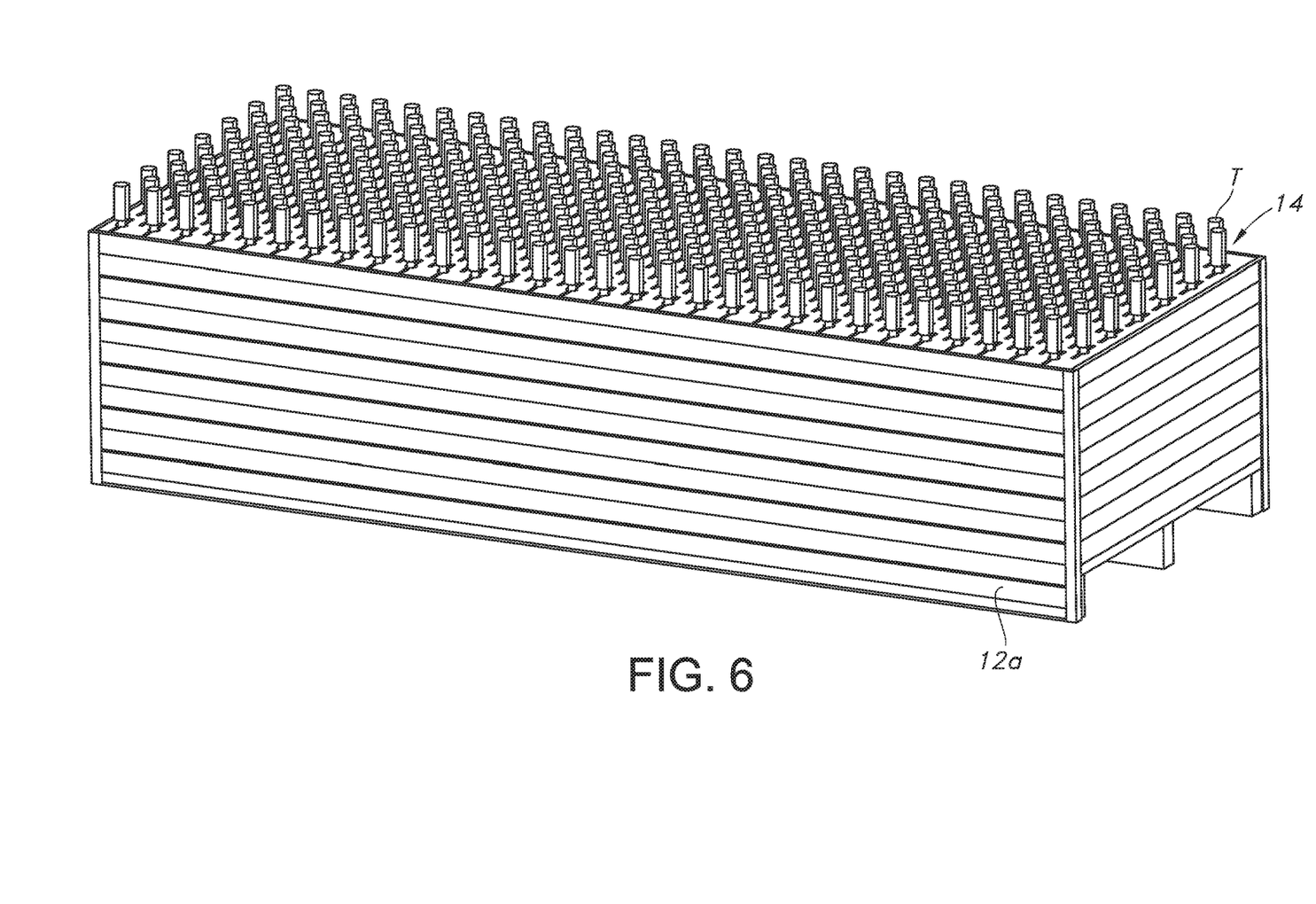
Figure 7:
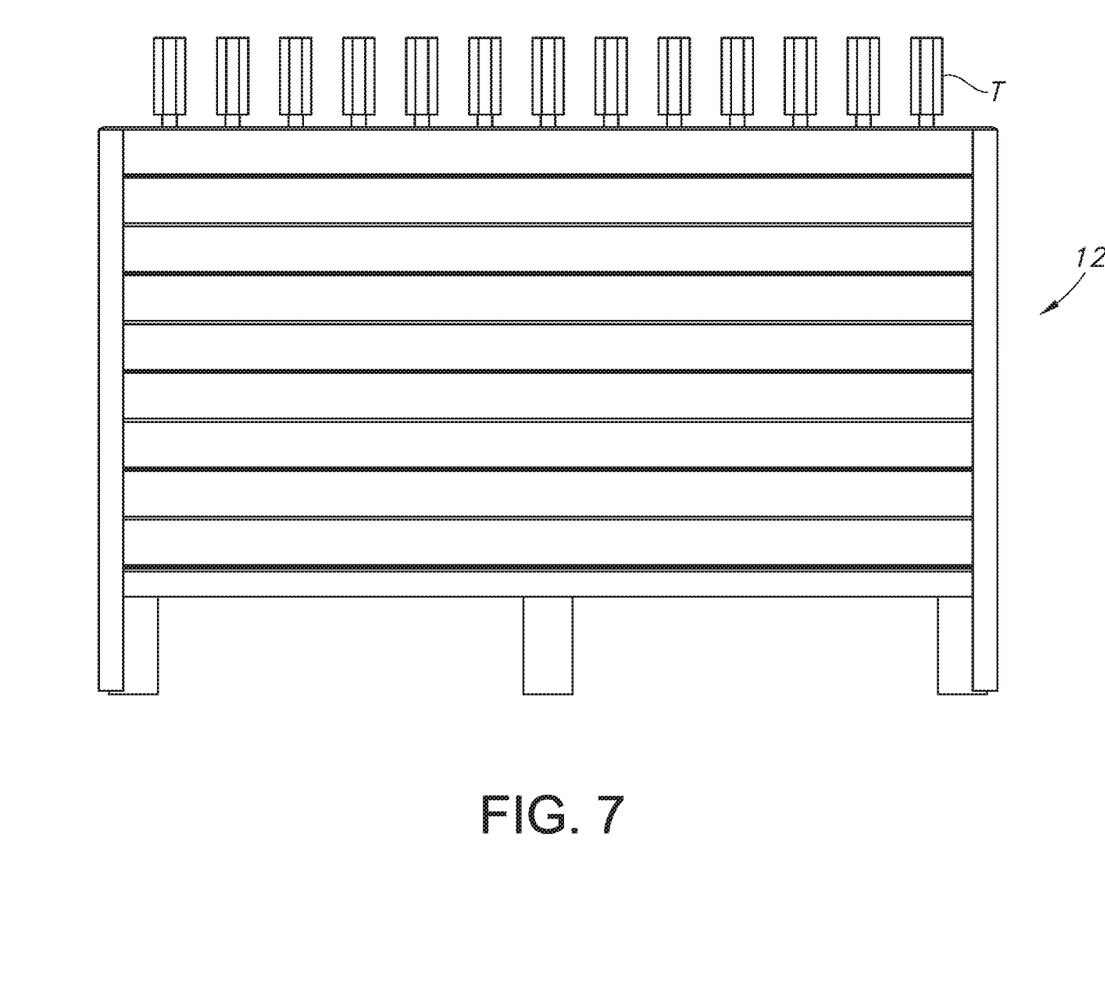

As can be appreciated, the layout of the holders 14 of the storage pod 12 may be such that the roof bolts T are arranged in a grid. That is, a plurality of roof bolts T located in a first aligned row X extend in a first direction D1, and a plurality of roof bolts located in a second aligned row Y extend in a second direction D2 that is generally perpendicular to the first direction, with at least one roof bolt being common to each row. As can be appreciated, a plurality of generally parallel rows may result when this pattern is expanded to include multiple rows in each direction. In any case, from the resulting grid thus formed, the manipulator (e.g., arm 18) may be reliably guided to a particular location for retrieving a selected roof bolt T (such as by gripping the upper exposed portion) for delivery to the bolting module 24. As indicated, the arrangement may be such that more than sixteen bolts, but fewer than about three hundred, are provided in a single pod 12.

Figure 8:
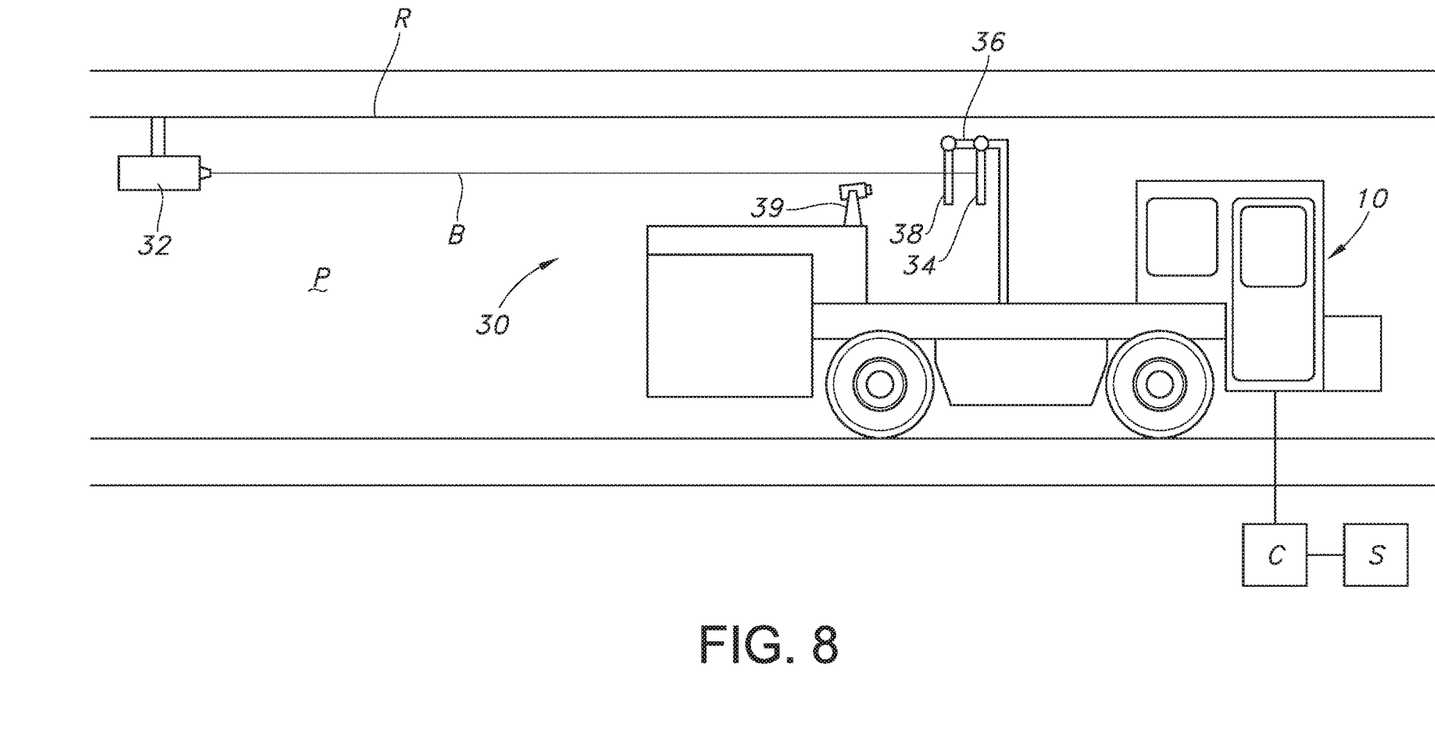
FIG. 8 is a schematic view of one embodiment of a guidance system for a mine machine, such as a roof bolter.

A further aspect of the disclosure pertains to a guidance system 30 providing a simple and accurate method of determining if a machine, such as bolter 10, is parallel to a desired heading and accurately positioned with respect to the sides of the mine passage P. In one embodiment, as illustrated in FIG. 8, the system 30 includes a single point type laser generator 32 for projecting a laser beam B in a travel direction. The laser 32 may be hung from the roof R of the mine passage P at a known survey location and aligned parallel with a direction of travel within the passage. A reflective target 34 is mounted onto the roof bolter 10 (or other machine). The target 34 may be mounted on a gimbal 36 to maintain verticality, even though the bolter 10 may undulate due to uneven floor conditions.

Figure 9:
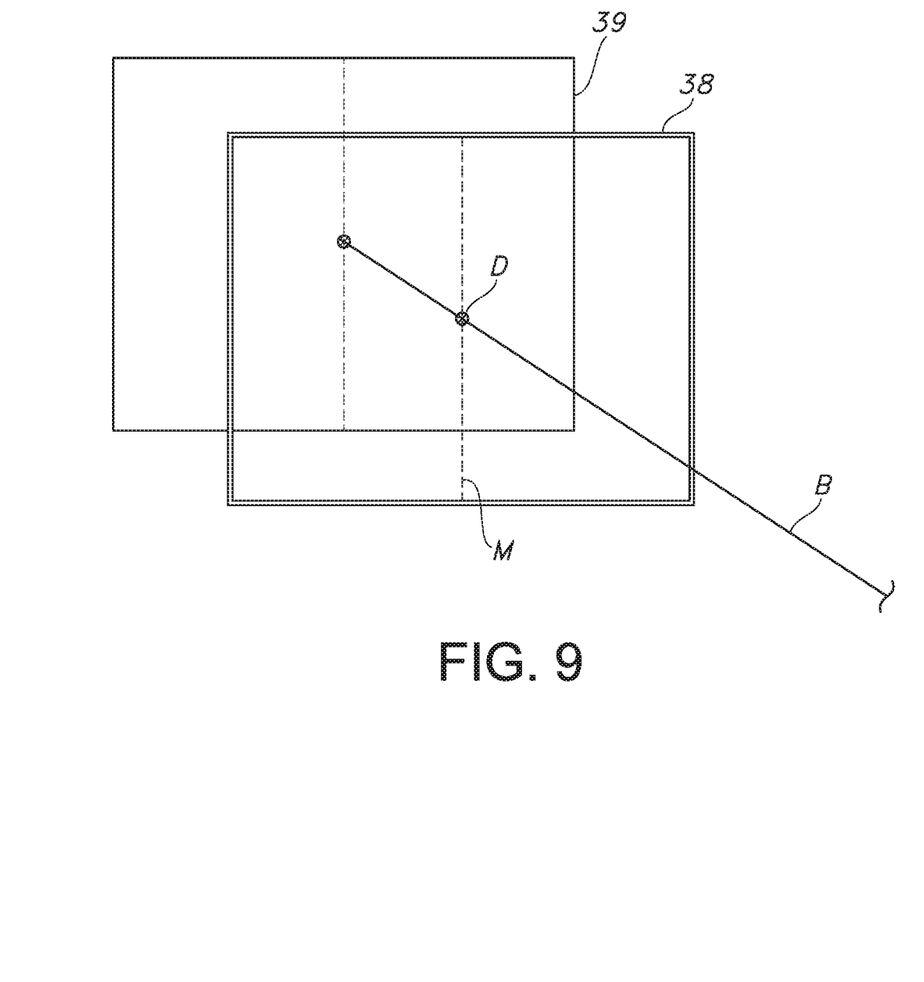
FIG. 9 illustrates targets used in the system of FIG. 8.

With reference to FIGS. 8 and 9, a second, translucent or transparent (e.g., clear) target 38 may be placed in series with the reflective target 34. Although the second target 38 allows the beam B to pass, it will still show some reflection. Consequently, the operator now has two target points forming a line, which may insure that the bolter 10 is travelling in a manner that is generally aligned with (e.g., parallel to) a travel direction of the mine passage P.

For manual movement of the bolter 10, the operator can simply look at the target and steer accordingly to keep the laser dot D in the center of the target 34, which may be determined using an alignment marking M. For automated control, a camera, such as a video camera 39, may be mounted to the bolter 10 or machine to replace the need for the operator to look at the target 34. The video camera 39 may feed captured video to a computer with video capture software that identifies the exact location of the laser dot D on the reflective target 34. If the dot moves from the center of the target 34 (as indicated by the marking M), an onboard controller or computer C for controlling the direction of travel of the bolter 10 may issue a suitable turn command to a steering control module S to correct the position of the bolter.

Figure 10:
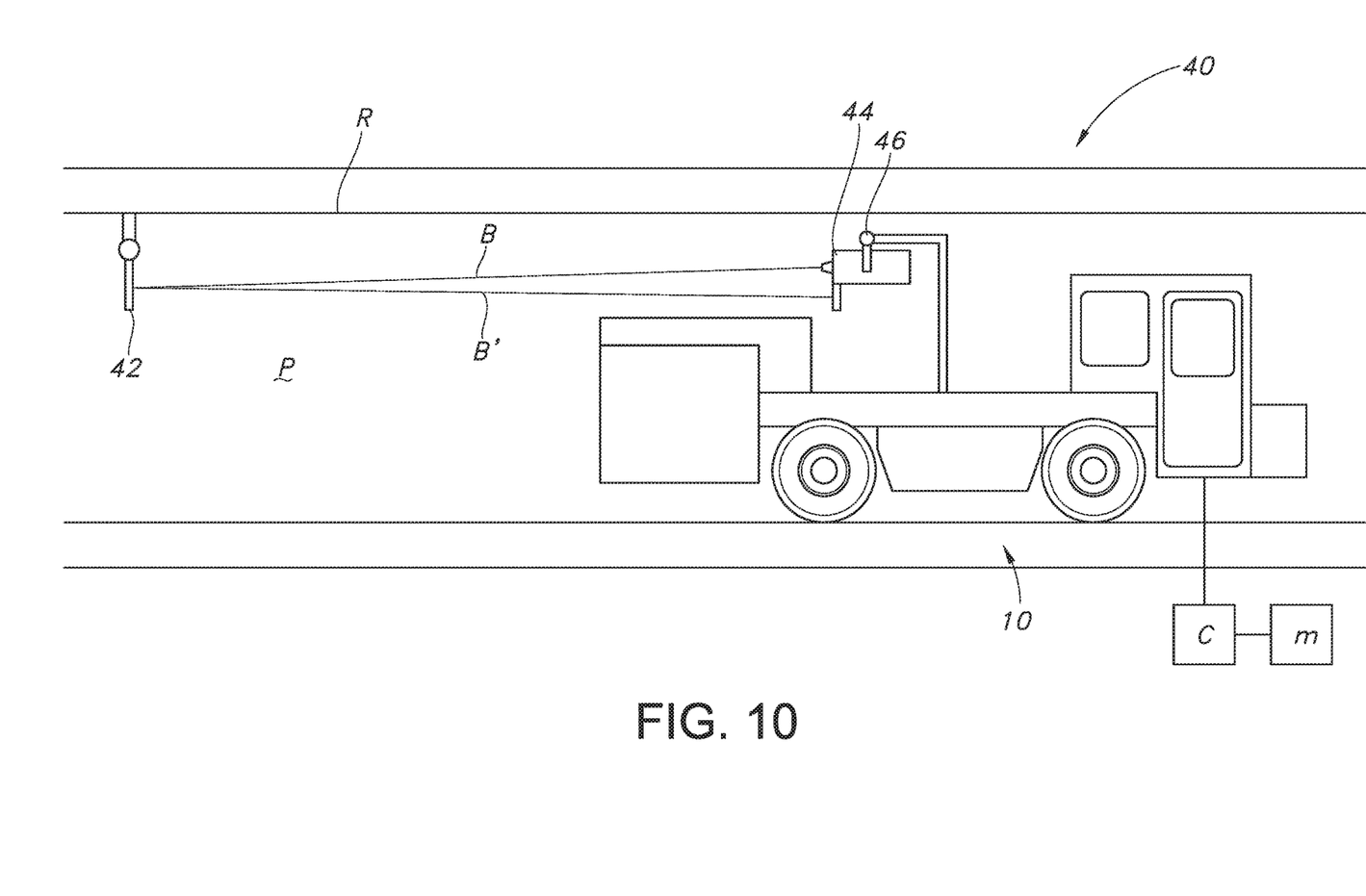
FIG. 10 is another embodiment of a guidance system for a mine machine.

According to a further aspect of the disclosure, a distance sensor system 40 may also be employed to provide a simple and accurate method of determining the correct distance of the roof bolter 10 or other machine from a specific point. A reflective target 42 is hung from the roof R of the mine passage P at a known survey location and aligned generally parallel with the entry. A retro-reflective laser distance sensor 44 (e.g., a "time of flight" sensor) is mounted onto the roof bolter 10. The laser distance sensor 44 is mounted on a gimbal 46 to insure verticality, even though the bolter 10 may undulate due to uneven floor conditions.

In use, the laser sensor 44 sends a laser beam B out to the reflective target 42, which reflects it back to the sensor (beam B'). The time of flight for the beam B, B' is measured allowing the sensor 44 to calculate the distance to the reflective target 42 very accurately. The actual distance from the target 42 may then be displayed on a computer screen (not shown) for the operator. For manual movement of the bolter 10, the operator can simply look at the screen and tram the bolter until the correct distance is reached.

For automated control, the sensed distance from the target 42 may be fed into a controller or computer C. When a tram command is initiated (either by an operator or automatically), the computer C will continuously monitor the location of the bolter 10. As the bolter 10 approaches the desired location, the computer C may issue control commands to a drive and steering module M to begin slowing down the forward movement at a controlled rate and then stopping it at a precise location for placement of a roof bolt.

The system 40 thus provides a simple and accurate method of determining the accurate distance of the roof bolter 10 from a specific point. In addition, a scanning laser can be used to generate a map of a heading using collected data. Together, these guidance systems 30, 40 can provide accurate machine positioning and, in the case of a bolter 10, help to ensure that the bolts are installed in a straight line having the correct spacing, without relying on operator guesswork and the resulting potential for error.

Figure 11:
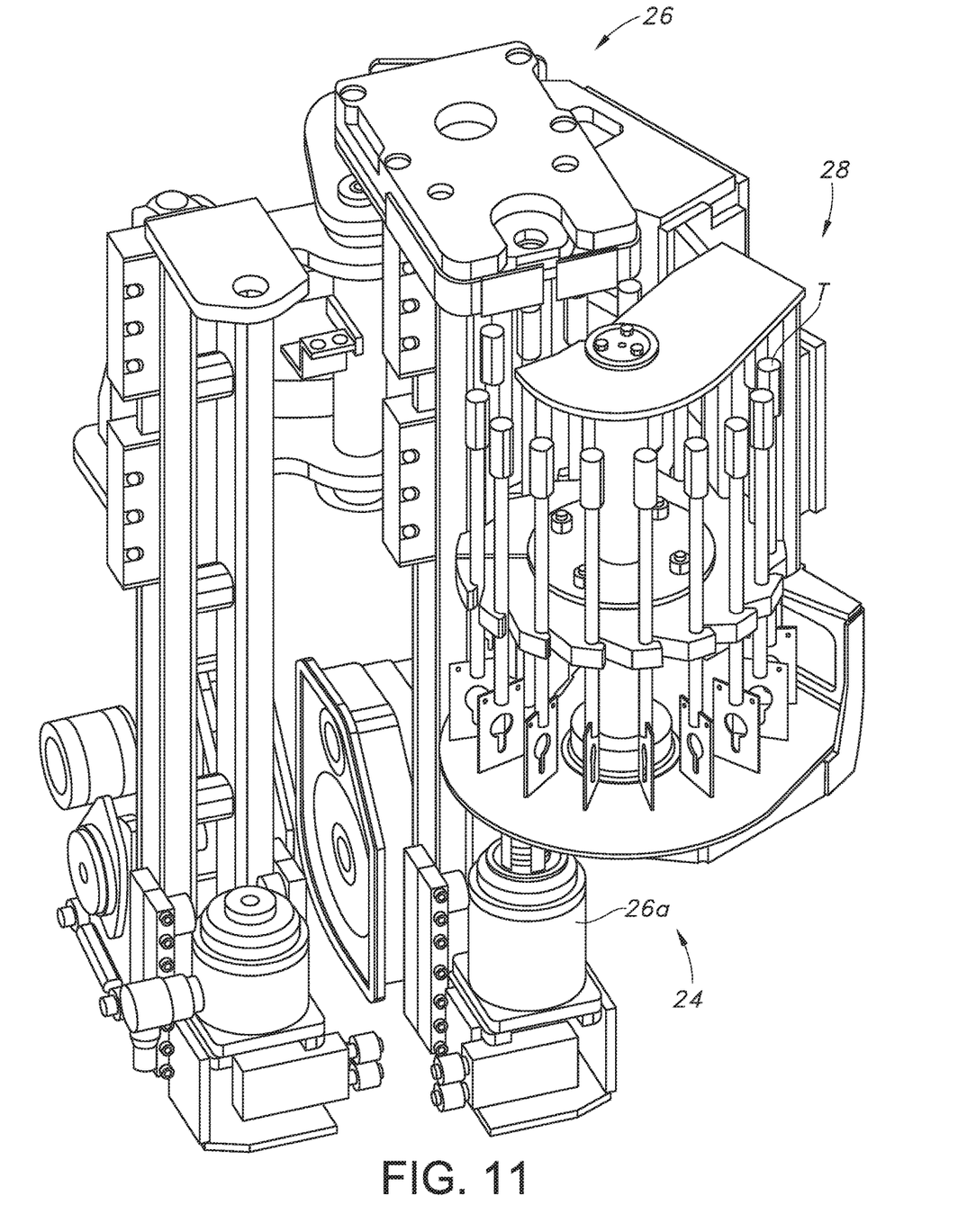
FIG. 11 illustrates an example of a drill mast associated with a rotary carousel for holding roof bolts.

As can be appreciated, the proposed concepts may utilize a building block approach to provide a machine or bolter 10 which can be fully autonomous, including in connection with the pod 12 and manipulator (e.g., arm 18). The bolter 10 may also utilize dedicated drill and bolt modules 24 associated with the mast 26 (with drill 26a), which can accept either bolt carousels 28 with a relatively smaller number of roof bolts (e.g., less than 30), or the carousels can be removed and replaced with the bolt storage pod 12 and a robotic bolt manipulator (e.g. arm 18). Further details may be found in one or more of U.S. Patent Application Publication Nos. 2007/0283614 and 2006/0283614.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristicˆ), parameters), integers), or step(s), and does not preclude addition of one or more additional components), feature(s), characteristics), parameters), integer(s), step(s), or groups thereof. Each of these terms is considered equivalent in meaning to the phrase "consisting essentially of". Each of the phrases "consisting of and "consists of, as used herein, means "including and limited to".

The phrase "consisting essentially of, as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range from 1 to 6" also refers to, and encompasses, all possible sub-ranges, such as from 1 to 3", from 1 to 4", from 1 to 5", from 2 to 4", from 2 to 6", from 3 to 6", etc., and individual numerical values, such as T, "1.3", "2", "2.8", "3", "3.5", "4", "4.6", "5", "5.2", and "6", within the stated or described numerical range of from 1 to 6". This applies regardless of the numerical breadth, extent or size, of the stated numerical range.

Moreover, for stating or describing a numerical range, the phrase "in a range of between about a first numerical value and about a second numerical value", is considered equivalent to, and meaning the same as, the phrase "in a range of from about a first numerical value to about a second numerical value", and, thus, the two equivalents meaning phrases may be used interchangeably. For example, for stating or describing the numerical range of room temperature, the phrase "room temperature refers to a temperature in a range of between about 20° C. and about 25° C.," and is considered equivalent to, and meaning the same as, the phrase "room temperature refers to a temperature in a range of from about 20° C. to about 25° C."

Terms of approximation, such as the terms about, substantially, approximately, etc., as used herein, refers to ±10% of the stated numerical value.

The phrase "operatively connected", as used herein, equivalency refers to the corresponding synonymous phrases "operatively joined", and "operatively attached," where the operative connection, operative joint or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

The invention claimed is:

1. A material handling system for a roof bolter, comprising:
   a plurality of roof bolts; and
   a storage pod including a plurality of spaced, fixed holders, each fixed holder receiving at least one of the plurality of roof bolts;
   wherein the plurality of fixed holders comprise a first plurality of openings in a first aligned row extending in a first direction, and second plurality of openings in a second aligned row extending in a second direction generally perpendicular to the first direction.

2. The material handling system of claim 1, further including a manipulator for retrieving individual roof bolts of the plurality of roof bolts from the storage pod for installation.

3. The material handling system of claim 1, wherein the storage pod comprises a box for at least partially receiving a portion of each of the plurality of roof bolts, and the plurality of holders each comprise an opening.

4. The material handling system of claim 1, wherein the plurality of fixed holders are arranged in a grid.

5. The material handling system of claim 4, wherein the grid comprises first and second rows of fixed holders forming the plurality of fixed holders.

6. The material handling system of claim 5, wherein the first and second rows of fixed holders are generally parallel.

7. The material handling system of claim 5, wherein the first and second rows of fixed holders are generally perpendicular.

8. The material handling system of claim 7, wherein each of the plurality of fixed holders comprises aligned openings formed in spaced plates.

9. The material handling system of claim 1, wherein the plurality of roof bolts comprises between about sixteen and about three hundred roof bolts.

10. A roof bolter including the material handling system of claim 1.

11. The material handling system of claim 1, wherein the plurality of fixed holders comprise a grid of openings.

12. The material handling system of claim 11, wherein at least one opening in the grid of openings surrounds at least one of the plurality of roof bolts.

13. The material handling system of claim 1, wherein the storage pod stores a first plurality of vertically-oriented discrete roof bolts in a first aligned row extending in a first direction, and second plurality of vertically-oriented discrete roof bolts in a second aligned row extending in a second direction generally perpendicular to the first direction.

14. A material handling system for a roof bolter, comprising:
    a plurality of roof bolts; and a storage pod including a plurality of spaced holders fixed in place within the storage pod and arranged in a grid, at least one roof bolt of the plurality of roof bolts being located in each holder of the plurality of spaced holders.

15. The material handling system of claim 14, wherein at least one holder in the grid surrounds at least one of the plurality of roof bolts.

16. The material handling system of claim 14, wherein the storage pod stores a first plurality of vertically-oriented discrete roof bolts in a first aligned row extending in a first direction, and second plurality of vertically-oriented discrete roof bolts in a second aligned row extending in a second direction generally perpendicular to the first direction.

17. The material handling system of claim 14, wherein the plurality of spaced holders comprise a first plurality of openings in a first aligned row extending in a first direction, and second plurality of openings in a second aligned row extending in a second direction generally perpendicular to the first direction.

18. The material handling system of claim 14, wherein at least one opening in the grid of openings surrounds at least one of the plurality of roof bolts.

19. The material handling system of claim 14, wherein the grid of openings comprises a first row of aligned openings extending in a first direction, and second row of aligned openings extending in a second direction that is generally perpendicular to the first direction.

20. A roof bolter including the material handling system of claim 14.

* * * * *